(12) United States Patent
Guillot et al.

(10) Patent No.: US 12,251,894 B2
(45) Date of Patent: Mar. 18, 2025

(54) METHOD FOR CLOSING AN INJECTION-MOULDING MOULD USING ANTI-NIP TAPES

(71) Applicant: SAFRAN AIRCRAFT ENGINES, Paris (FR)

(72) Inventors: Maxime Guillot, Moissy-Cramayel (FR); Maxime Marie Désiré Blaise, Moissy-Cramayel (FR); Hubert Jean Marie Fabre, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 279 days.

(21) Appl. No.: 17/640,626

(22) PCT Filed: Sep. 3, 2020

(86) PCT No.: PCT/FR2020/051530
§ 371 (c)(1),
(2) Date: Mar. 4, 2022

(87) PCT Pub. No.: WO2021/048486
PCT Pub. Date: Mar. 18, 2021

(65) Prior Publication Data
US 2022/0402223 A1    Dec. 22, 2022

(30) Foreign Application Priority Data

Sep. 12, 2019 (FR) ...................... 1910080

(51) Int. Cl.
*B29C 70/54* (2006.01)
*B29C 33/30* (2006.01)
(Continued)

(52) U.S. Cl.
CPC .......... *B29C 70/549* (2021.05); *B29C 33/302* (2013.01); *B29C 70/32* (2013.01);
(Continued)

(58) Field of Classification Search
CPC ..... B29C 70/549; B29C 33/302; B29C 70/32; B29C 70/345; B29C 70/48; B29C 70/54;
(Continued)

(56) References Cited

U.S. PATENT DOCUMENTS 8,322,971 B2    12/2012    Coupe et al.
9,821,520 B2    11/2017    Kendrick
(Continued)

FOREIGN PATENT DOCUMENTS

WO    WO2017089680 A1 *  6/2017

OTHER PUBLICATIONS

International Search Report as issued in International Patent Application No. PCT/FR2020/051530, dated Dec. 14, 2020.

*Primary Examiner* — Cynthia L Schaller
(74) *Attorney, Agent, or Firm* — Pillsbury Winthrop Shaw Pittman LLP

(57) ABSTRACT

A method for closing an injection mold for manufacturing a revolution part made of composite material, the mold including a mandrel supporting a fiber preform and angular sectors comprising an annular base to come into contact with the fiber texture, the annular base extending between first and second side edges along a circumferential direction. The method includes successive positioning and fixing the angular sectors on the mandrel, the annular base of each sector compacting the fiber preform portion present oppositely, the side edges of the annular base of each angular sector being in contact with the side edges of the annular base of the adjacent sectors. Before the positioning and fixing of the angular sectors on the mandrel, strip s are placed on the exposed surface of the fiber preform, each strip covering an area of the fiber preform located facing a junction area between two adjacent angular sectors.

9 Claims, 10 Drawing Sheets

(51) Int. Cl.
  *B29C 70/32* (2006.01)
  *B29C 70/34* (2006.01)
  *B29L 31/00* (2006.01)

(52) U.S. Cl.
  CPC ..... *B29C 70/345* (2013.01); *B29L 2031/7504* (2013.01); *B29L 2031/757* (2013.01)

(58) Field of Classification Search
  CPC ....... B29L 2031/7504; B29L 2031/757; B29B 11/16; F05D 2220/36; F05D 2300/6012; F05D 2300/603; F01D 25/24
  See application file for complete search history.

(56) References Cited

U.S. PATENT DOCUMENTS

| | | | |
|---|---|---|---|
| 2009/0297788 A1* | 12/2009 | Dull | B29C 70/342 |
| | | | 156/182 |
| 2014/0239540 A1 | 8/2014 | Plante et al. | |
| 2018/0370082 A1 | 12/2018 | Mathon et al. | |

* cited by examiner

[Fig. 1]
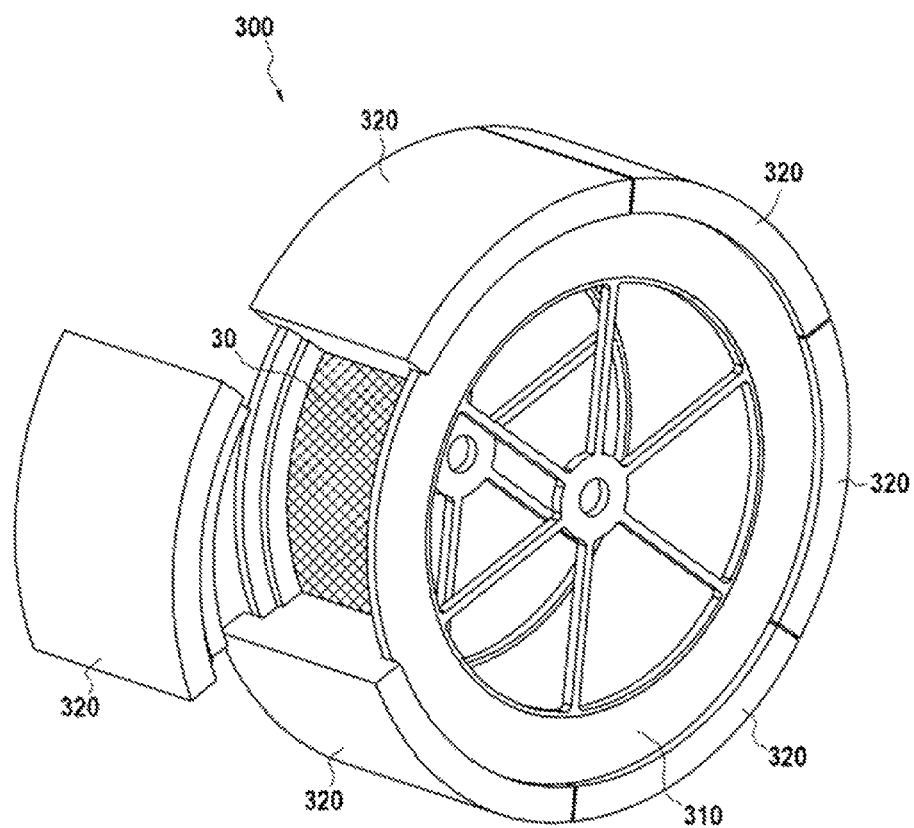
PRIOR ART

[Fig. 2A]
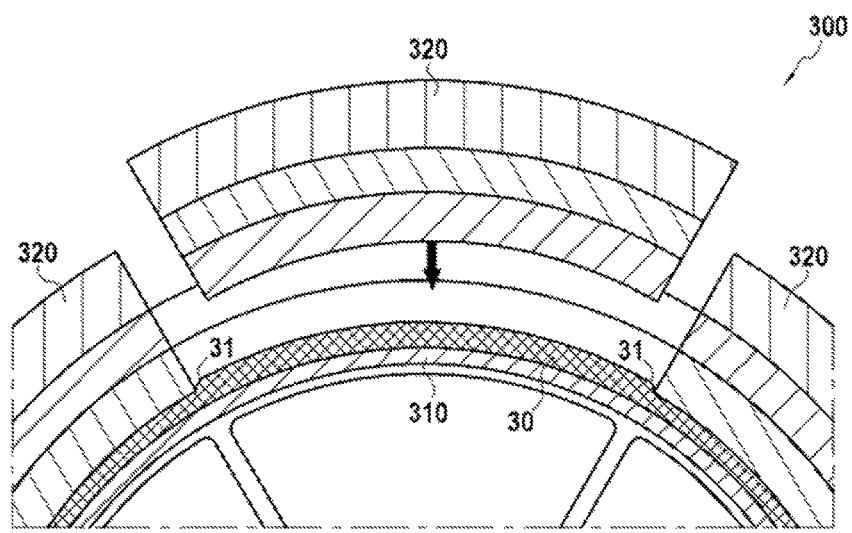
PRIOR ART

[Fig. 2B]
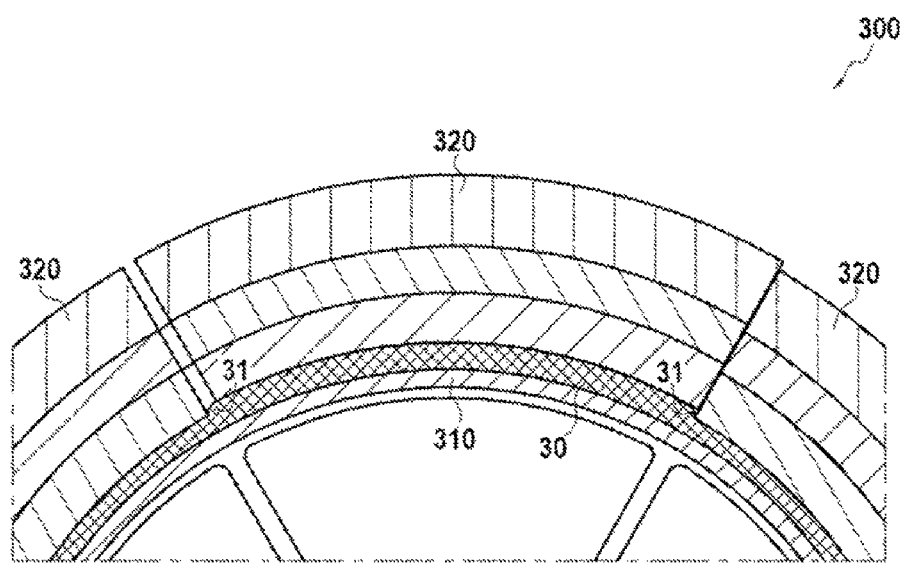
PRIOR ART

[Fig. 2C]
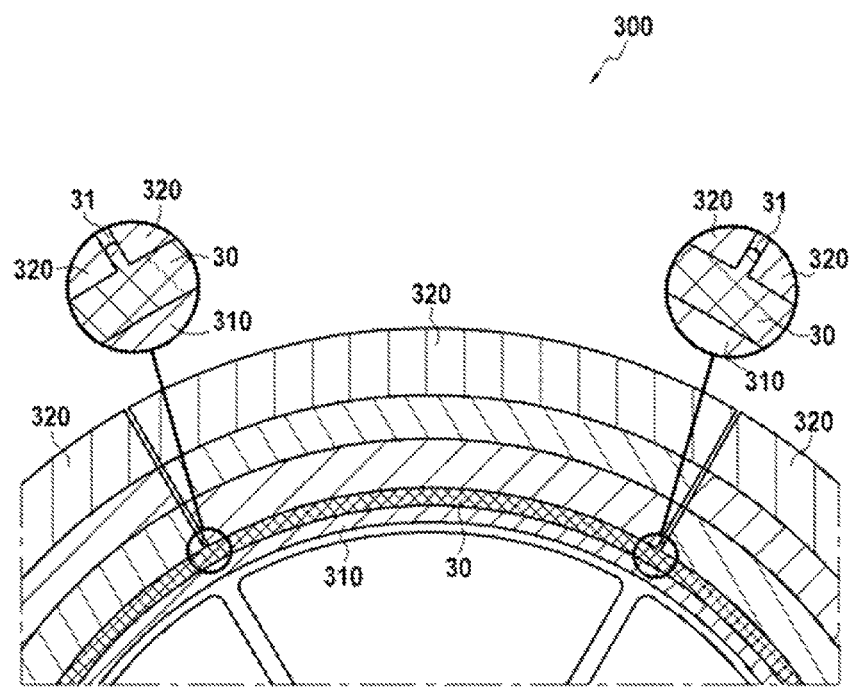
PRIOR ART

[Fig. 3]
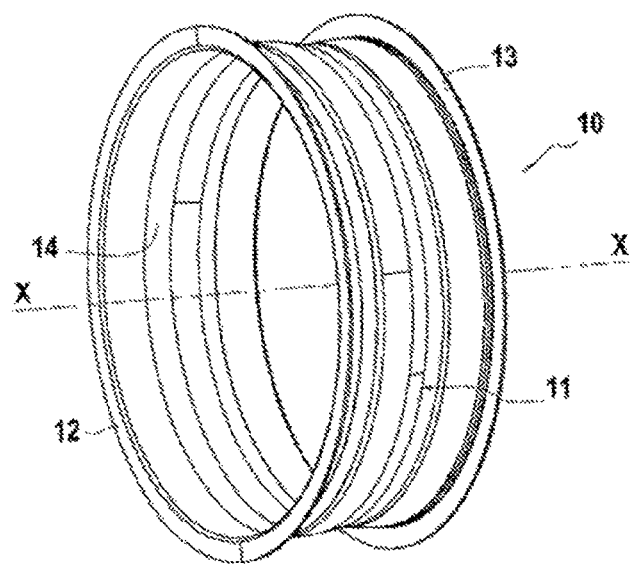

[Fig. 4]
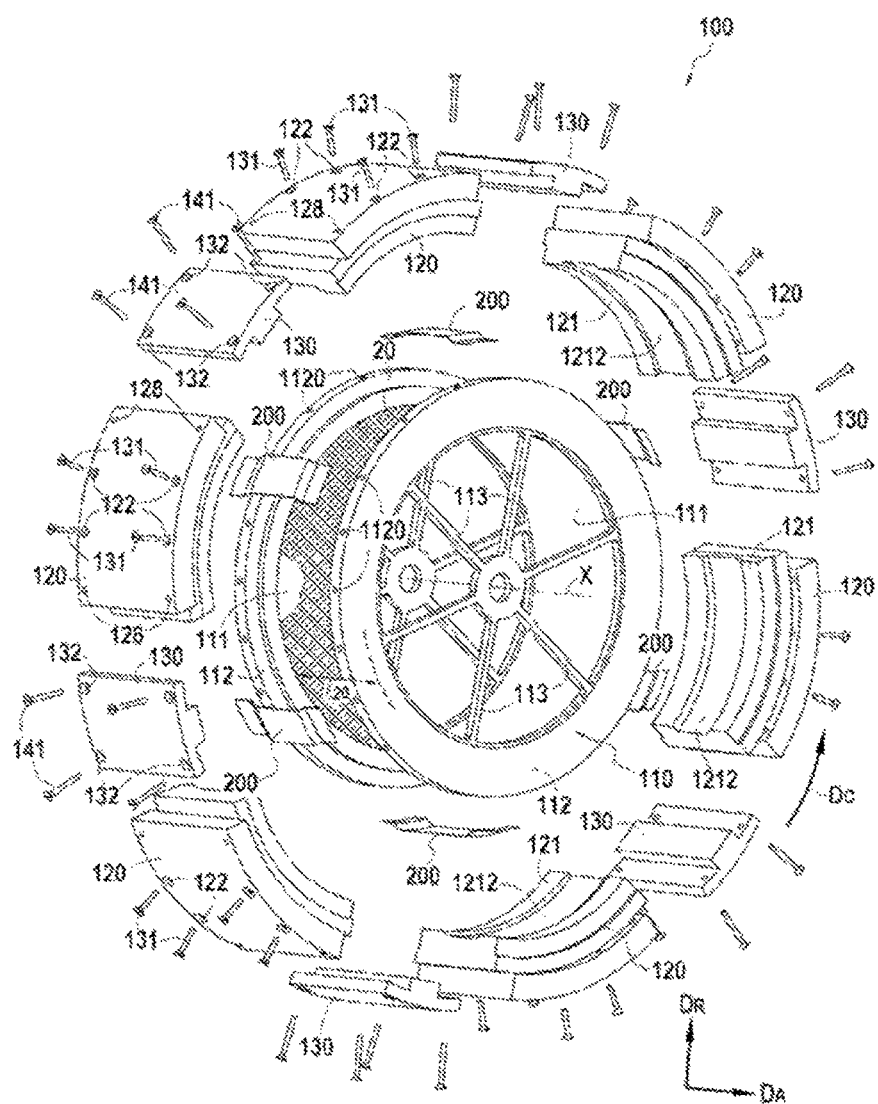

[Fig. 5]
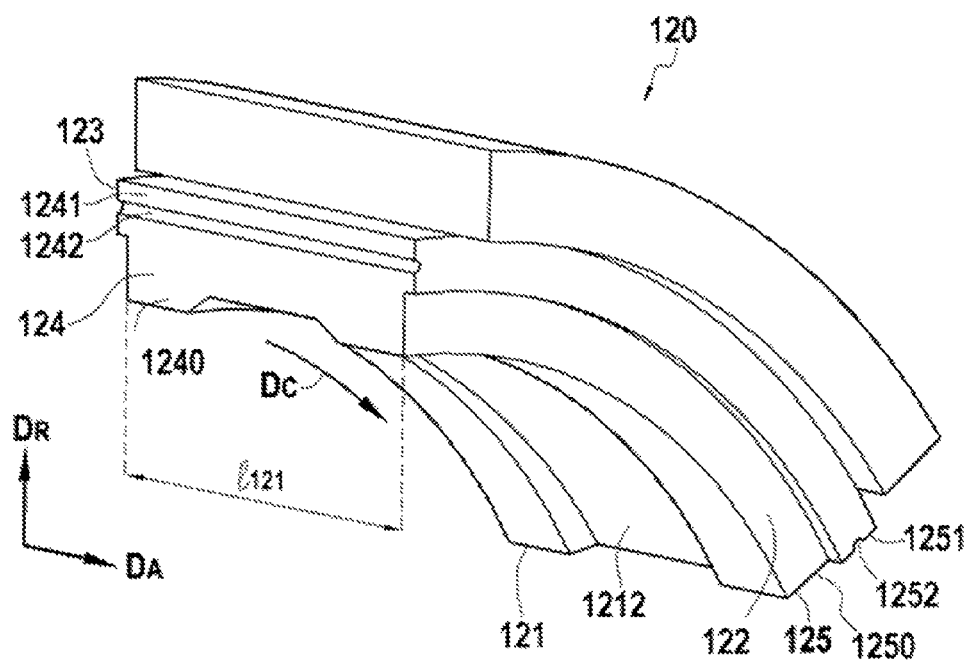
[Fig. 6]
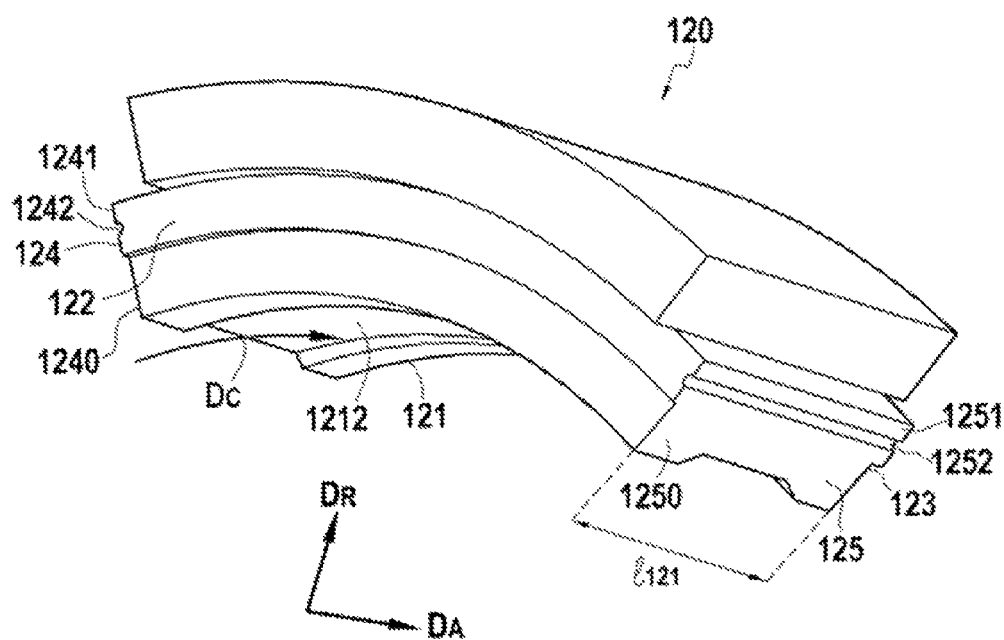

[Fig. 7]
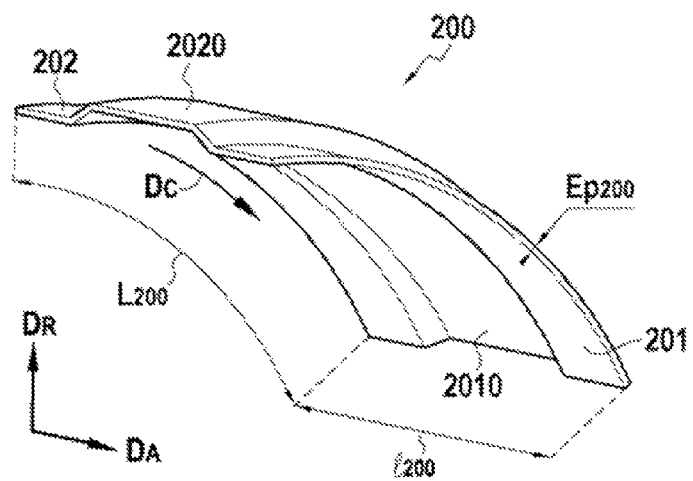
[Fig. 8]
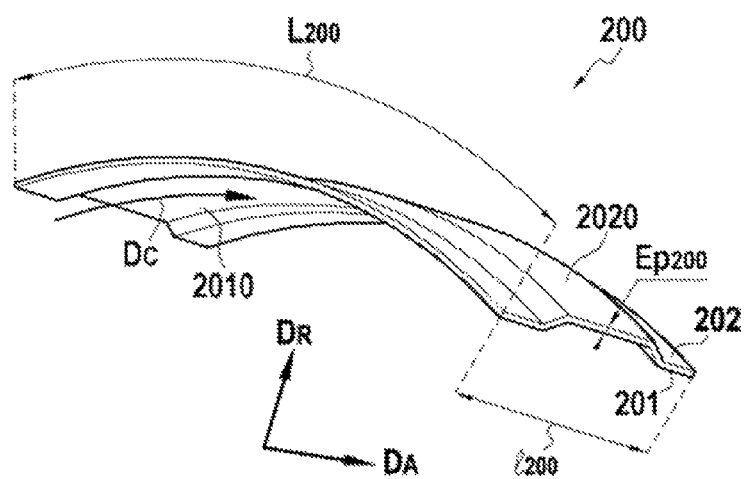

[Fig. 9A]
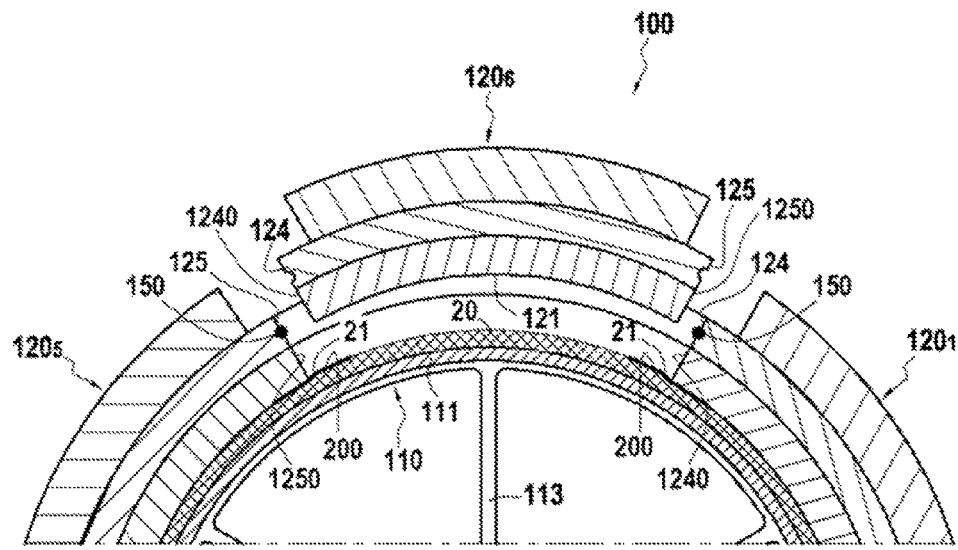
[Fig.9B]
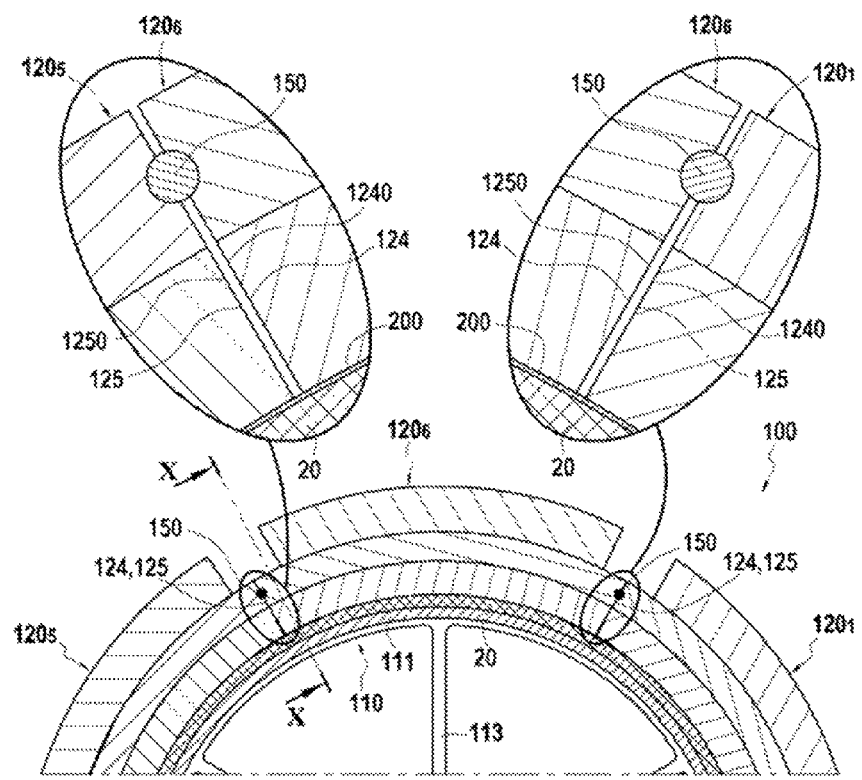

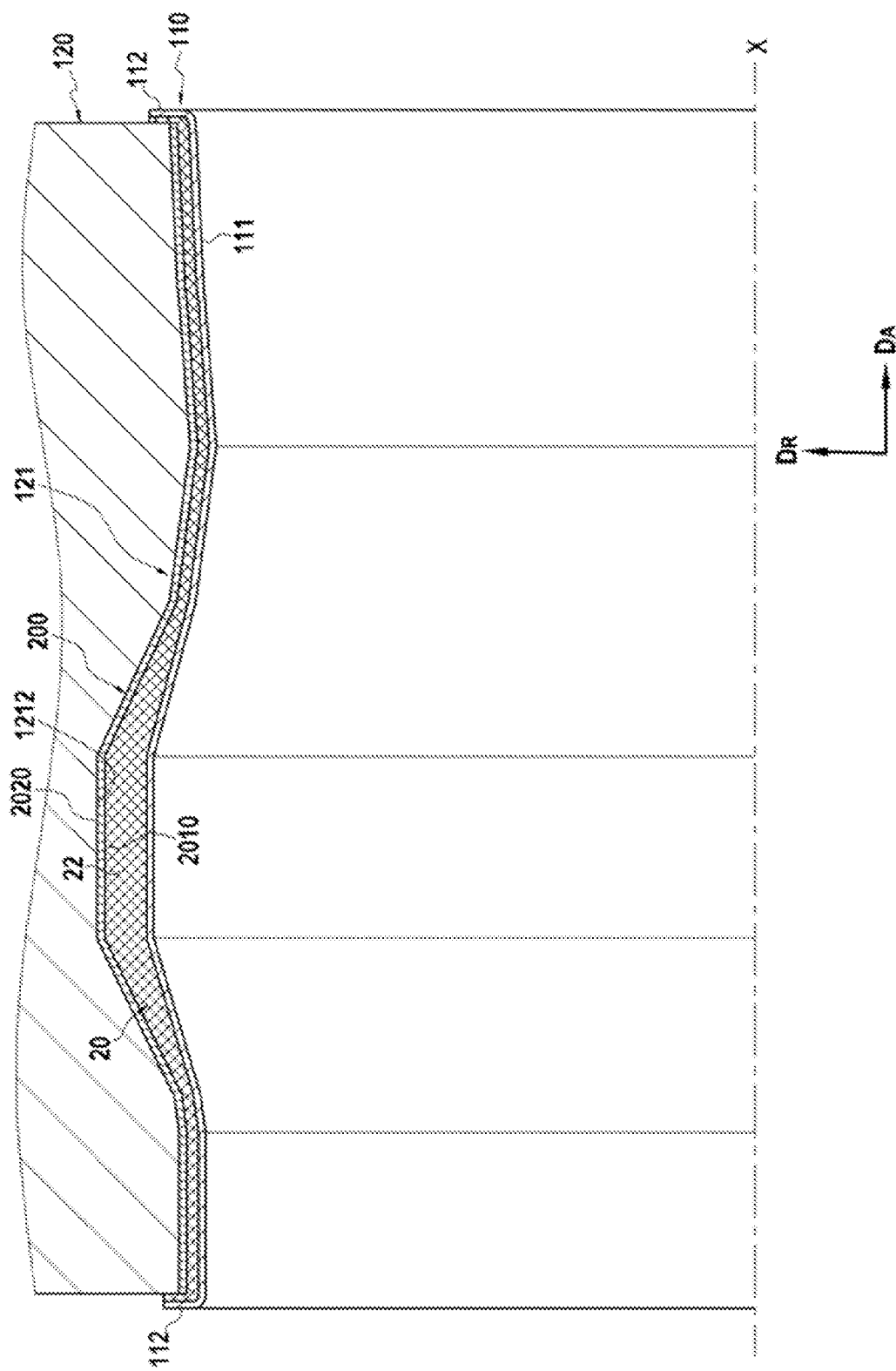

METHOD FOR CLOSING AN INJECTION-MOULDING MOULD USING ANTI-NIP TAPES

CROSS-REFERENCE TO RELATED APPLICATIONS

This application is the U.S. National Stage of PCT/FR2020/051530, filed Sep. 3, 2020, which in turn claims priority to French patent application number 1910080 filed Sep. 12, 2019. The content of these applications are incorporated herein by reference in their entireties.

TECHNICAL FIELD

The present invention relates to the general field of the manufacture of revolution parts such as gas turbine casings.

PRIOR ART

In the aeronautical field, attempts are made to reduce the mass of the components of the engines while maintaining their mechanical properties at a high level. For example, in an aeronautical turbomachine, the fan casing defining the contour of the air inlet flowpath of the engine and inside which the rotor supporting the blades of the fan is housed is now made of composite material.

The manufacture of a fan casing made of composite material begins with the installation, by winding, of fiber reinforcement on a mandrel whose profile matches that of the casing to be produced. The fiber reinforcement can be made, for example, by three-dimensional or multilayer weaving as described in U.S. Pat. No. 8,322,971. This fiber reinforcement is shaped to constitute a single piece comprising a tubular portion and flanges corresponding to the clamps of the casing. The manufacture continues with the densification of the fiber preform by a polymer matrix which consists of impregnating the preform with a resin and polymerizing the latter to obtain the final part.

The invention relates more particularly to the manufacturing mode where the impregnation of the fiber preform is carried out by the injection molding process known as RTM (for Resin Transfer Molding). According to this process, the fiber preform is enclosed in a rigid mold of fixed geometry comprising a mandrel or drum on which the fiber preform is wound and a counter-mold which is deposited on the fiber preform and whose shape corresponds to the revolution part to be obtained, and the pressurized and temperature-controlled resin is injected inside the mold after having brought the walls of the two mold portions together and having created a vacuum therein if necessary. Once the resin is injected, it is polymerized by heating the mold and after injection and polymerization, the final part is demolded then trimmed to remove excess resin and the chamfers are machined to obtain the desired part, for example a casing.

As the preform expands during its winding on the mandrel, i.e. it has an extra thickness compared to the theoretical thickness of the finished part, the closing of the mold thus ensures the function of final compaction of the preform to bring it to its final thickness.

FIG. 1 illustrates an RTM injection mold 300 composed of a drum or mandrel 310 on which a fiber preform 30 is wound and of a counter-mold formed by a plurality of angular sectors 320. The closing of the mold is performed by the angular sectors 320 which ensure the compaction of the preform. A method for closing such a mold is in particular described in document US 2018/370082.

However, the closing of the mold by such angular sectors turns out to be a delicate operation. Indeed, as illustrated in FIG. 2A, one sector out of two is first placed, each of which locally compacting the fiber preform. The fiber preform 30 has blisters 31 in the vicinity of the ends of each angular sector 320 because it is no longer compacted. The closing of the mold continues with the positioning of the remaining angular sectors between the sectors already positioned as illustrated in FIGS. 2B and 2C. During the installation of these sectors, the blisters 31 are pushed back to the edges of the sectors already positioned because the preform is displaced from the middle of the sector by the compaction. In addition, the shape of the sectors and the direction of closing of the mold make that there remains a space between the sectors until the last moment of the closing of the mold. Part of the blisters 31 then enter this space to be finally pinched between the edges of the adjacent sectors as represented in FIG. 2C. The fibers of the preform thus pinched lead to the creation of defects called "pinch fibers" defects on the finished part. Indeed, these pinch fibers end up on the finished part, i.e. after injection of the resin into the preform and transformation of the latter into a matrix, in the form of blisters present on the outer surface of the part. In order to have a satisfactory surface condition, the blisters are sanded, which leads to a break in the continuity of the yarns or strands in the part and, consequently, a significant reduction in its mechanical properties.

DISCLOSURE OF THE INVENTION

The aim of the invention is to propose a solution that avoids the aforementioned drawbacks.

This aim is achieved in particular thanks to a method for closing an injection mold for the manufacture of a revolution part made of composite material, the mold comprising:
 a mandrel supporting a fiber preform obtained by winding of a fiber web, the mandrel comprising an annular wall, the profile of the external surface of which corresponds to that of the inner surface of the part to be manufactured,
 a plurality of angular sectors comprising an annular base intended to come into contact with the fiber texture, the annular base extending between first and second longitudinal edges along an axial direction and between first and second side edges along a circumferential direction, the annular base of each sector having a shape corresponding to the shape of the revolution part to be manufactured,
 the method comprising the successive positioning and fixing of the angular sectors on the mandrel, the annular base of each sector compacting the fiber preform portion present oppositely, the side edges of the annular base of each angular sector being in contact with the side edges of the annular base of the adjacent sectors,
 characterized in that, before the positioning and fixing of the angular sectors on the mandrel, strips are placed on the exposed surface of the fiber preform, each strip covering an area of the fiber preform located facing a junction area between two side edges of the annular base of two adjacent angular sectors and in that each strip has a shape corresponding to the shape of the annular base of the two adjacent angular sectors at the junction area.

Thus, according to the method of the invention, the fiber preform is protected from any pinching between two adjacent angular sectors during the closing of the mold. Indeed, the strips covering the preform in areas corresponding to the junction areas between the sectors, they prevent the preform portion present at the blisters from being pushed back to the side edges of the angular sectors, which allows avoiding any pinching of the preform between the side edges of two adjacent sectors. Consequently, the appearance of "pinch fibers" type defects on the finished part is avoided. It is thus possible to compact the preform with each of the angular sectors without affecting the mechanical properties of the finished part.

According to one particular characteristic of the method for closing an injection mold of the invention, the strips are made of composite material comprising a fiber reinforcement densified by a matrix. The fiber reinforcement of each strip can comprise carbon fibers or glass fibers or a mixture of carbon and glass fibers. The matrix can be obtained from a thermosetting or thermoplastic resin or material.

According to another particular characteristic of the method for closing an injection mold of the invention, the strips are made of metal material.

According to another particular characteristic of the method for closing an injection mold of the invention, each strip has a thickness less than or equal to 0.2 mm.

According to another particular characteristic of the method for closing an injection mold of the invention, angular sectors are first positioned and fixed on the mandrel at a determined distance from each other so as to arrange a space between two angular sectors, the remaining angular sectors then being positioned and fixed on the mandrel in the spaces arranged between the already fixed angular sectors.

According to another particular characteristic of the method for closing an injection mold of the invention, each angular sector includes first and second grooves present respectively on the first and second side faces, the grooves extending along the axial direction, a seal being housed both in the first groove of a first side face of an angular sector and in the second groove of a second side face of an adjacent angular sector.

The invention also relates to a method for manufacturing a revolution part made of composite material comprising:
the production by three-dimensional or multilayer weaving of a fiber texture in the form of a web,
the winding of the fiber texture on several turns superimposed on a mandrel of an injection mold so as to form a fiber preform, the injection mold comprising a plurality of angular sectors,
the closing of the injection mold in accordance with the invention,
the densification of the fiber preform by a matrix so as to obtain a revolution part made of composite material comprising a fiber reinforcement densified by a matrix,
the demolding of the composite material part.

BRIEF DESCRIPTION OF THE DRAWINGS

FIG. 1 is a schematic perspective view of an injection mold according to the prior art, FIG. 2A is a partial view in radial section showing a step of closing the mold of FIG. 1, FIG. 2B is a partial view in radial section showing another step of closing the mold of FIG. 1, FIG. 2C is a partial view in radial section showing another step of closing the mold of FIG. 1, FIG. 3 is a schematic perspective view of a fan casing made of composite material, FIG. 4 is a schematic perspective view of an injection mold in accordance with one embodiment of the invention, FIG. 5 is a schematic perspective view showing an angular sector of the mold of FIG. 4, FIG. 6 is another schematic perspective view showing an angular sector of the mold of FIG. 4, FIG. 7 is a schematic perspective view showing a strip of the mold of FIG. 4, FIG. 8 is another schematic perspective view showing a strip of the mold of FIG. 4, FIG. 9A is a partial view in radial section showing the beginning of the positioning of an angular sector during the closing of the mold of FIG. 4, FIG. 9B is a partial view in radial section showing the mold of FIG. 4 closed, FIG. 10 is a view in radial and axial section of the mold of FIG. 9B.

DESCRIPTION OF THE EMBODIMENTS

The invention generally applies to any casing made of organic matrix composite material fora gas turbine.

The invention will be described below in the context of its application to a fan casing of an aeronautical gas turbine engine.

FIG. 3 shows a perspective view of a fan casing 10 that can be fabricated using a mold and method according to the invention. Such a casing is centered on a longitudinal axis XX and comprises an annular wall 11 delimited upstream by an upstream clamp 12 and downstream by a downstream clamp 13 (the upstream and the downstream being defined with respect to the direction of flow of the gas stream in the gas turbine). The inner surface 14 of the annular wall 11 is intended to delimit the air inlet flowpath in the gas turbine and/or support panels (acoustic attenuation, abradable material, etc.).

FIG. 4 is a schematic perspective view of a mold according to the invention being closed. Such a mold can be used for the impregnation by a process of the RTM (Resin Transfer Molding) type of a fiber preform in order to manufacture a fan casing 10 such as the one presented previously. The fiber preform can be made by three-dimensional weaving of a fiber texture in the form of a web with fibers, for example carbon, glass, aramid or ceramic fibers, and the impregnation matrix can be made of polymer, for example epoxide, bismaleimide or polyimide.

The mold 100 is rotatably mounted on a drive shaft (not represented) centered on the axis XX, and comprises a mandrel 110. Subsequently, the axial $D_A$ and radial $D_R$ directions will be defined with respect to this axis XX, the axial direction $D_A$ being parallel to the axis XX and the radial direction $D_R$ being perpendicular to the axis XX. Reference will also be made to a circumferential direction $D_C$ which, as shown in FIG. 4, corresponds to a direction which is tangent to any circle centered on the axis XX. This direction is perpendicular both to the axial direction $D_A$ and to a radial direction $D_R$.

The mandrel 110 comprises an annular wall 111 taking the form of a shank supporting a fiber preform 20 formed by winding of a fiber web, and two side flanges 112. The mandrel 110 is held on its drive shaft by means of rays 113.

The flanges 112 form a bearing intended to receive the folded portions of the preform 20 wound on the mandrel 110, and which are intended to form the upstream 12 and downstream 13 clamps of the fan casing 10.

The mold 100 further comprises a counter-mold composed of several angular sectors 120 (here six in number) assembled in a sealed manner on the mandrel 110. In the example described here, the sectors are locked together in a sealed manner by locking keys 130 which hold a flat seal between the sectors (not represented in FIG. 4). According to one variant, the sectors can be directly locked together by bolting using oblique screws. In this case, the sealing between the sectors is achieved by compaction of a seal housed in the grooves present on the side edges of the sectors as explained below.

The angular sectors 120 are assembled on the side flanges 112 by clamping screws 131 passing through orifices 122 present in the sectors 120 and screwed into tapped holes 1120 present on the side flanges 112. The screws 131 allow the assembly of the sectors 120 on the flanges 112 and the adjustment of the compaction pressure which is applied on the fiber preform 20.

In the example described here, the angular sectors 120 are locked together by clamping screws 141 passing through orifices 132 present in the locking keys 130 and screwed into tapped holes 128 present on the angular sectors 120 or in bolts integrated into the tooling. A key 130 is fixed between two adjacent sectors 120 by two rows of screws 141 extending longitudinally on the ends of each sector 120. The assembly of the locking keys 130 is done radially from outside, once the sectors 120 are assembled on the mandrel 110. In this way, the keys ensure a circumferential clamping of the sectors 120 together.

O-rings (not represented) positioned on the flanges 112 ensure the sealing between the sectors 120 and the mandrel 110.

FIGS. 5 and 6 illustrate an angular sector 120. Each angular sector 120 comprises an annular base 121 intended to come into contact with the fiber texture 20. The annular base extends between first and second longitudinal edges 122 and 123 along the axial direction $D_A$ and between first and second side edges 124 and 125 along the circumferential direction $D_C$, the first side edge 124 of the annular base 121 of an angular sector 120 being in contact with a second side edge 125 of the annular base of an adjacent angular sector (FIG. 9B).

The annular base 121 has a shape corresponding to that of the revolution part to be manufactured. In the example described here, the annular base 121 has a changing shape along the axial direction $D_A$ corresponding to the changing profile of the casing to be manufactured. More specifically, the annular base 121 includes a recessed portion 1212 corresponding to the shape of an extra thickness 22 present on the preform 20 and intended to form a retention area in the final casing (FIG. 10). The recessed portion extending over the entire length of the annular base 121 along the circumferential direction $D_C$.

The first side edge 124 of the annular base 121 of each angular sector 120 includes a lower portion 1240. The second side edge 125 of the annular base 121 of each angular sector includes a lower portion 1250.

Each angular sector 120 further includes a first side face 1241 parallel to the radial direction $D_R$ and present in the extension of the first side edge 124 of the annular base 121, and a second side face 1251 parallel to the radial direction $D_R$ and present in the extension of the second side edge 125 of the annular base 121. This facilitates the fixing of the sectors 120 on the mandrel 110.

Furthermore, first and second grooves 1242 and 1252 may be present respectively on the first and second side faces 1241 and 1251, the grooves extending along the axial direction $D_A$. A seal 150 is housed both in the first groove 1242 of a first side face 1241 of an angular sector and in the second groove 1252 of a second side face 1251 of an adjacent angular sector. This allows obtaining a seal between the sectors and locking the sectors directly together without using clamping keys and flat seals as described above.

In accordance with the invention, strips 200 are positioned on the exposed surface of the fiber preform 20 before the closing of the injection mold 100 by the angular sectors 120. More specifically, a strip 200 is placed at each location of the exposed surface of the preform 20 which is intended to face a junction area between two side edges of the annular base of two adjacent angular sectors (FIG. 4). Each strip 200 has dimensions able to cover this area. In the example described here, each strip 200 has along the axial direction $D_A$ a width $I_{200}$ at least equal to the width $I_{121}$ of the annular base 121 of each angular sector 120 and a length $L_{200}$ allowing the strip 200 to extend along the circumferential direction $D_C$ beyond the side edges 124 and 125 of two adjacent angular sectors (FIGS. 4, 7 and 8). The length of the strips may be less than the width of the fiber preform when the areas with a risk of pinching are not present over the entire width of the preform. According to one variant, several strips can be disposed adjacently along the axial direction $D_A$.

As illustrated in FIGS. 7 and 8, each strip 200 has a shape corresponding to the shape of the annular base of the two adjacent angular sectors at the junction area. More specifically, the outer surface 202 of each strip intended to come into contact with the annular bases of two adjacent angular sectors includes a bulge portion 2020 whose shape fits perfectly with the recessed portion 1212 present on the annular base 121 of each angular sector 120. Correspondingly, the inner face 201 of each strip 200 includes a recessed portion 2010 resuming the shape of the recessed portion 1212 present on the annular base 121 of each angular sector 120. The portions 2010 and 2020 extend over the entire length of each strip along the circumferential direction $D_C$.

According to one aspect of the invention, the strips 200 are made of composite material from a fiber reinforcement densified by a matrix. Various types of composite materials and manufacturing methods can be used. The strips can be manufactured from preforms made by:

drape-forming of unidirectional or bidirectional plies in carbon fibers, glass fibers or a mixture of carbon and glass fibers, each ply being pre-impregnated with a matrix precursor such as an epoxy resin for example, infusion of an epoxy resin in a dry fiber texture obtained for example by drape-forming of unidirectional or bidirectional plies, drape-forming of unidirectional or bidirectional plies in carbon fibers, glass fibers or a mixture of carbon and glass fibers, each ply being pre-impregnated with a resin or a thermoplastic material such as polyetheretherketone (PEEK), polyetherketoneketone (PEKK), polyaryletherketones (PAEK), polyetherimide (PEI).

The strip preform is then shaped and heat-treated to transform the resin or the thermosetting (polymerization) or thermoplastic (heating then cooling) material into a matrix.

The shaping of the strip preform can be advantageously carried out by molding on the annular base 121 of an angular sector 120, which ensures that the strip will perfectly match the shape of the annular base during the closing of the mold.

The stiffness of the strip is adjusted so that it has enough flexibility not to break during its deformation imposed by the angular sector fixed first as explained below.

The strips can also be made of metal material, in particular by sheet metal stamping or additive manufacturing (for example by nickel electroplating) in the same shape as that of the annular base of the angular sectors.

Each composite material or metal material strip has a thickness $E_{p200}$ of less than or equal to 0.2 mm, in particular so as not to form a too large cavity in the fiber preform during the closing of the mold.

FIGS. 9A and 9B illustrate the positioning of an angular sector during the closing of the mold 100. More specifically, in FIG. 9A, a last angular sector $120_6$ is being positioned between two angular sectors $120_1$ and $120_5$ already positioned in order to finalize the closing of the mold 100. According to one characteristic of the mold closing method of the invention, one angular sector out of two is placed and fixed first, then the closing is completed by closing the free spaces between two angular sectors with the remaining sectors. Other mold closing configurations can however be envisaged.

In FIG. 9A, the fiber preform 20 has blisters 21 in the vicinity of the side edge 125 of the angular sector $120_5$ and of the side edge 124 of the angular sector $120_1$ due to its compaction by these angular sectors. In accordance with the invention, a strip 200 is present on the exposed surface of the preform 20 at each blister 21. In this mold closing step, the strips 200 are deformed at the blisters 21 under the effect of the compaction force imposed by the angular sectors already positioned (the sectors $120_5$ and $120_1$ in the FIG. 9A).

The closing of the mold continues with the positioning and fixing of the last angular sector $120_6$ as illustrated in FIG. 9B. During the installation of this sector, the blisters 21 cannot enter the space present between the angular sectors due to the presence of the strips 200. The strips 200 prevent the preform portion present at the blisters 21 from being pushed back to the side edges of the sectors $120_5$ and $120_1$, which allows avoiding any pinching of the preform between the side edges of two adjacent sectors.

As can be seen in FIG. 10, once the mold is closed, each strip 200 perfectly follows the shape of the annular base 121 of each angular sector 120 of the mold 100. In the example described here, each strip 200 has along the axial direction $D_A$ a shape identical to that of the profile of the annular bases 121 of the adjacent angular sectors between which it is placed. Each strip 200 includes here particularly on its outer surface a curved portion 2020 whose shape adapts to the shape of the recessed portion 1212 present on the annular base 121 of each angular sector 120 and corresponding to the shape of an extra thickness 22 present on the preform 20 and intended to form a retention area in the final casing.

With the strips according to the invention, the appearance of "pinch fibers" type defects on the finished part is avoided. It is thus possible to compact the preform 20 with each of the angular sectors 120 without affecting the mechanical properties of the finished part.

The manufacture of the casing 10 represented in FIG. 3 begins with the production of a fiber texture by three-dimensional weaving between warp yarns and weft yarns. By "three-dimensional weaving" or "3D weaving", it is meant here a weaving mode by which some at least of the weft yarns bind warp yarns over several layers of warp yarns or vice versa. The fiber texture may have an interlock weave. By "interlock weave", it is meant here a weave in which each layer of weft yarns binds several layers of warp yarns, with all the yarns of the same weft column having the same movement in the weave plane. Other weaves can be envisaged. The yarns used can be in particular yarns made of carbon, glass or silicon carbide fibers. The fiber texture has the form of a web which is wound on several turns on the mandrel 110 of the mold 100 to form the fiber preform 20.

The mold 100 is then closed by means of the angular sectors 120 described above, these sectors also carrying out a compaction of the preform 20.

The fiber preform is then densified, which consists in filling the porosity of the latter with the material constituting the matrix. To this end, the liquid matrix precursor, for example a resin, is injected into the entire preform present in the mold. The transformation of the precursor into an organic matrix, namely its polymerization, is carried out by heat treatment, generally by heating of the mold, after removal of any solvent and crosslinking of the polymer, the preform still being held in the mold with a shape corresponding to that of the part to be made. The organic matrix can be in particular obtained from epoxy resins, such as, for example, the high-performance epoxy resin sold, or from liquid precursors of carbon or ceramic matrices.

The densification of the fiber preform can be carried out by the well-known transfer molding process called RTM (Resin Transfer Molding) which consists in injecting a thermosetting resin into the internal space of the mold containing the fiber preform, a pressure gradient being generally established in this internal space between the place where the resin is injected and the orifices for discharging it in order to monitor and optimize the impregnation of the preform with the resin. Once the resin is injected into the entire preform, it is polymerized by heat treatment in accordance with the RTM process.

After injection and polymerization, the part is demolded.

The part is finally trimmed to remove the excess resin and the chamfers are machined to obtain a casing 10 having a shape of revolution as illustrated in FIG. 3.

The invention claimed is:

1. A method for closing an injection mold for the manufacture of a revolution part made of composite material, the mold including
   a mandrel supporting a fiber preform obtained by winding of a fiber web, the mandrel comprising an annular wall, a profile of an external surface of which corresponds to that of a inner surface of the part to be manufactured,
   a plurality of angular sectors each angular sector comprising an annular base portion configured to come into contact with a fiber texture, the annular base extending between first and second longitudinal edges along an axial direction and between first and second side edges along a circumferential direction, the annular base of each sector having a shape corresponding to a shape of the revolution part to be manufactured,
   the method comprising a successive positioning and fixing of the angular sectors on the mandrel, the annular base of each sector compacting a fiber preform portion present oppositely, the first and second side edges of the annular base of each angular sector being in contact with the first and second side edges of the annular base of adjacent sectors,
   wherein, before the positioning and fixing of the angular sectors on the mandrel, strips are placed on an exposed surface of the fiber preform, each strip covering an area of the fiber preform located facing a junction area between the first and second side edges of the annular base of two adjacent angular sectors and wherein each strip has a shape corresponding to the shape of the annular base of the two adjacent angular sectors at the junction area.

2. The method according to claim 1, wherein the strips are made of composite material comprising a fiber reinforcement densified by a matrix.

3. The method according to claim 2, wherein the fiber reinforcement of each strip comprises carbon fibers or glass fibers or a mixture of carbon and glass fibers.

4. The method according to claim 2, wherein the matrix is obtained from a thermosetting or thermoplastic resin or material.

5. The method according to claim 1, wherein the strips are made of metal material.

6. The method according to claim 2, wherein each strip has a thickness less than or equal to 0.2 mm.

7. The method according to claim 1, wherein angular sectors are first positioned and fixed on the mandrel at a determined distance from each other so as to arrange a space between two angular sectors, the remaining angular sectors then being positioned and fixed on the mandrel in spaces arranged between the already fixed angular sectors.

8. The method according to claim 1, wherein each angular sector includes first and second grooves present respectively on first and second side faces thereof, the first and second grooves extending along the axial direction, a seal being housed in the first groove of an angular sector and in the second groove of an adjacent angular sector.

9. A method for manufacturing a revolution part made of composite material comprising:
   producing by three-dimensional or multilayer weaving a fiber texture in the form of a web,
   winding the fiber texture on several turns superimposed on a mandrel of an injection mold so as to form a fiber preform, the injection mold comprising a plurality of angular sectors,
   closing the injection mold in accordance with claim 1,
   densifying the fiber preform by a matrix so as to obtain a revolution part made of composite material comprising a fiber reinforcement densified by a matrix,
   demolding the composite material part.

* * * * *

UNITED STATES PATENT AND TRADEMARK OFFICE
CERTIFICATE OF CORRECTION

| | | |
|---|---|---|
| PATENT NO. | : 12,251,894 B2 | Page 1 of 1 |
| APPLICATION NO. | : 17/640626 | |
| DATED | : March 18, 2025 | |
| INVENTOR(S) | : Maxime Guillot et al. | |

It is certified that error appears in the above-identified patent and that said Letters Patent is hereby corrected as shown below:

In the Claims

In Claim 4, Column 9, Line 5, should read as follows:
4. The method according to claim 2, wherein the matrix is obtained from a thermosetting or thermoplastic material.

Signed and Sealed this
Twenty-second Day of April, 2025

Coke Morgan Stewart
*Acting Director of the United States Patent and Trademark Office*